United States Patent
Barfield et al.

(10) Patent No.: US 7,302,452 B2
(45) Date of Patent: Nov. 27, 2007

(54) METHOD AND APPARATUS FOR HANDLING REQUESTS FOR FILES IN A DATA PROCESSING SYSTEM

(75) Inventors: Janel Guillory Barfield, Round Rock, TX (US); Joseph Vernon Lampitt, Austin, TX (US); Tommy Lucas McLane, Hutto, TX (US)

(73) Assignee: International Business Machines Corporation, Armonk, NY (US)

( * ) Notice: Subject to any disclaimer, the term of this patent is extended or adjusted under 35 U.S.C. 154(b) by 703 days.

(21) Appl. No.: 10/455,179

(22) Filed: Jun. 5, 2003

(65) Prior Publication Data

US 2004/0249784 A1     Dec. 9, 2004

(51) Int. Cl.
*G06F 13/14*     (2006.01)
*G06F 17/30*     (2006.01)

(52) U.S. Cl. .................... 707/200; 719/320; 718/100; 718/101; 718/108

(58) Field of Classification Search .................. None
See application file for complete search history.

(56) References Cited

U.S. PATENT DOCUMENTS

| | | | | |
|---|---|---|---|---|
| 5,421,001 A | 5/1995 | Methe | ........................ | 395/500 |
| 5,457,795 A | 10/1995 | Willman | ..................... | 395/600 |
| 5,680,558 A | 10/1997 | Hatanaka et al. | ........... | 395/334 |
| 5,778,359 A | 7/1998 | Stent | .............................. | 707/4 |
| 5,884,097 A | 3/1999 | Li et al. | ..................... | 395/863 |
| 6,016,515 A | 1/2000 | Shaw et al. | .................. | 709/301 |
| 6,047,312 A | 4/2000 | Brooks et al. | .............. | 709/203 |
| 6,098,102 A | 8/2000 | Nielsen et al. | .............. | 709/229 |
| 6,269,371 B1 | 7/2001 | Ohnishi | ........................ | 707/10 |
| 6,308,061 B1 * | 10/2001 | Criss et al. | .................. | 455/418 |
| 6,408,325 B1 | 6/2002 | Shaylor | ........................ | 709/108 |
| 6,578,055 B1 * | 6/2003 | Hutchison et al. | .......... | 707/204 |
| 6,611,848 B1 * | 8/2003 | Bradley | ........................ | 707/201 |
| 6,625,625 B1 * | 9/2003 | Kihara et al. | ................ | 707/204 |
| 6,889,249 B2 * | 5/2005 | Miloushev et al. | ......... | 709/213 |
| 6,907,268 B2 * | 6/2005 | Iyer | ............................ | 455/560 |
| 2002/0120791 A1 * | 8/2002 | Somalwar et al. | ........... | 709/330 |
| 2003/0195951 A1 * | 10/2003 | Wittel et al. | ................ | 709/220 |

FOREIGN PATENT DOCUMENTS

| | | |
|---|---|---|
| JP | 5303522 A | 11/1993 |
| JP | 10171689 A | 6/1998 |
| JP | 2001154861 A | 6/2001 |
| WO | WO 00/42756 | 7/2000 |

\* cited by examiner

*Primary Examiner*—William Thomson
*Assistant Examiner*—Abdou K Seye
(74) *Attorney, Agent, or Firm*—Duke W. Yee; Marilyn Smith Dawkins; Wayne P. Bailey

(57) ABSTRACT

A method, apparatus, and computer instructions for use in an operating system for managing requests for files. A request for a switch file from an application is received. The application points to the switch file. Many files may point to the same switch file. Location information for the switch file points to a set of files. A file from the set of files based on system information to form an identified file is identified. The identified file passes to the application. The system information may be already present within the system or passed to the system by a user or process.

20 Claims, 4 Drawing Sheets

METHOD AND APPARATUS FOR HANDLING REQUESTS FOR FILES IN A DATA PROCESSING SYSTEM

BACKGROUND OF THE INVENTION

1. Technical Field

The present invention relates generally to an improved data processing system and in particular, to a method and apparatus for processing data. Still more particularly, the present invention provides a method, apparatus, and computer instructions for managing requests for files.

2. Description of Related Art

An operating system is a master control program that runs the computer. The first program loaded when the computer is turned on is referred to as the "kernel" and is the main part of the operating system, which resides in memory at all times. The operating system sets the standards for all application programs that run in the computer. The applications "talk to" the operating system for all user interface and file management operations.

Data management is a function provided by the operating system. This function keeps track of the data on storage devices, such as disk, tape and optical storage devices. An application or program deals with data by file name and a particular location within the file. The operating system's file system knows where that data is physically stored (which sectors on disk) and intersection between the application and operating system is through the programming interface. Whenever an application needs to read or write data, it makes a call to the operating system. This call is also referred to as an application programming interface (API) call. The operating system employs a file system to allow for easy storage, location, and retrieval of data.

It is common for users to have multiple applications that use the same library file in a file system. These applications, however, may require different levels or versions of the library file to run correctly. Further, in some cases, different users may require different configuration files for the same application. Currently, a user must remove one file and install a second file if a particular library is needed. Both libraries use the same name, but are different versions, and, oftentimes, one application may not run correctly without the appropriate version of the library. In some cases, a user may execute a script and run the script prior to executing the application. These types of mechanisms for accessing the appropriate file require much time and effort for users.

Therefore, it would be advantageous to have an improved method, apparatus, and computer instructions for managing access to files in a data processing system.

SUMMARY OF THE INVENTION

The present invention provides a method, apparatus, and computer instructions for use in an operating system for managing requests for files. A request for a switch file from an application is received. The application points to the switch file. Many applications may point to the same switch file. Location information for the switch file points to a set of files. A file from the set of files based on system information to form an identified file is identified. The identified file passes to the application. The system information may be already present within the system, or passed to the system by a user or process.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
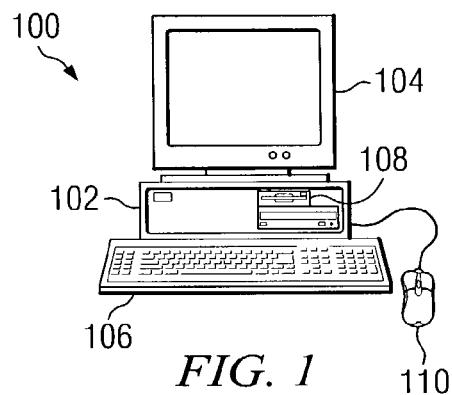
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
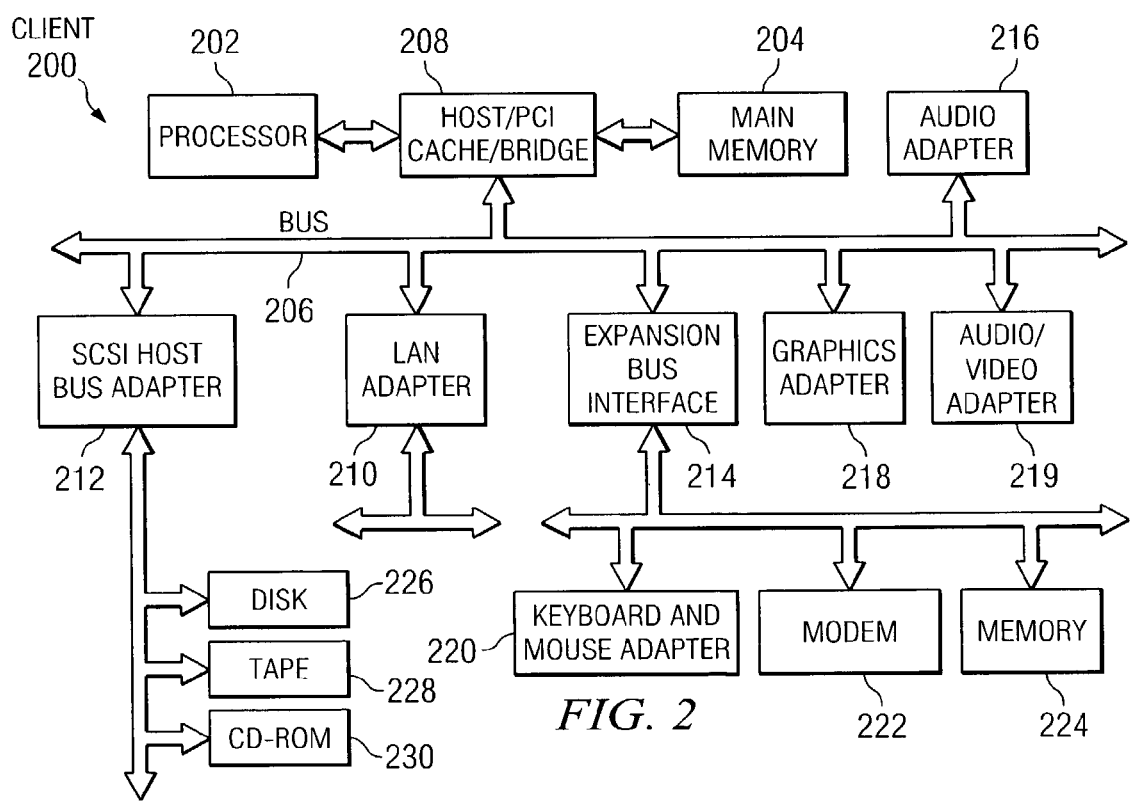
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications of programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention provides a method, apparatus, and computer instructions for managing requests made by applications for files. A switch file type is used to allow for multiple applications to point to the same file, but access different files. A switch file type is similar to a link, except this type of data structure points to different files based on system information. This system information may be, for example, a user identification or an identification of an application. Other types of system information may be any indentifier that is available to the operating system. This type of system information may include, for example, a group ID, a process group ID, a machine architecture, a number of processors, a uname, and environmental variable. Further, system information could be made available to the system in which this information is passed by a user or process to the operating system. The switch file type in these examples is a data structure that may take different forms. For example, the data structure may be a record in a file system or a table in the operating system.

Figure 3:
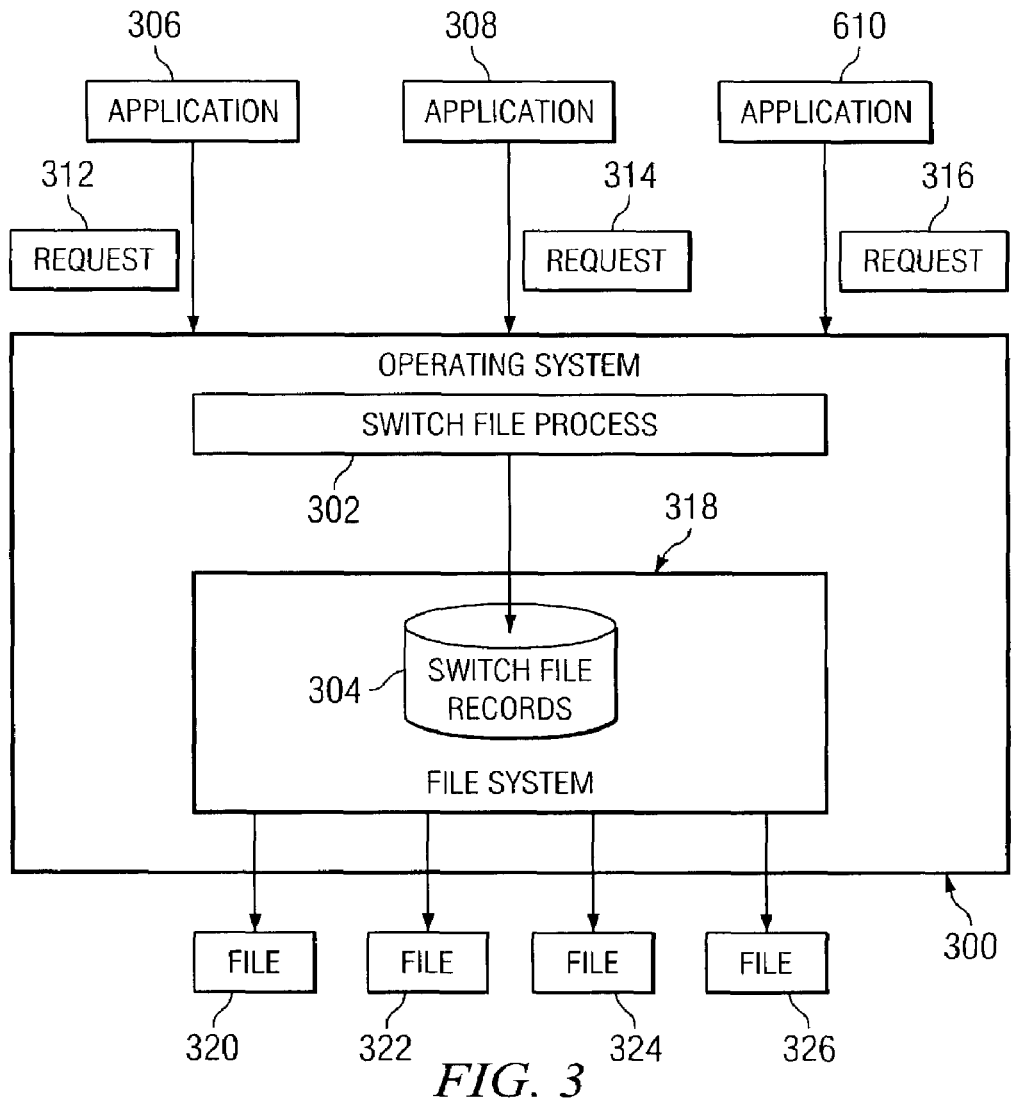
FIG. 3 is a diagram illustrating components used in managing requests for files in accordance with a preferred embodiment of the present invention.

Turning next to FIG. 3, a diagram illustrating components used in managing requests for files is depicted in accordance with a preferred embodiment of the present invention. In this example, operating system 300 includes switch file process 302, which is employed to create switch file records 304. These records include the information needed to point to the appropriate files based on system information. The different records in switch file records 304 may be created by various mechanisms. For example, a user may issue a command to create the switch file record. Alternatively, a graphical use interface may provide a conduit for prompting and receiving information to create associations of files with system information.

For example, a user may issue a command to create a switch file using the following command and parameters: <create> <switch_file> <target_file> <additional_info>

The parameter <switch_file> is the name and path of the file that will be called by the application. The parameter <target_file> is the name of the file that is to be used and includes the path to the file. The parameter <additional_info> defines the system information that is to be used to select the target file. For example, to link a user ID Luke to version 1.3 of /usr/lib/library, the following command is issued: crsf/usr/lib/library/usr/lib/library.1.3 userid Luke.

In response to this command, switch process 302 creates a record in switch file records 304 to link the switch file to the application and to provide for the redirect to the appropriate file based on the system information. Additional links may be placed in the record by additional commands. For example, an additional link to the switch file record described above may be made for a different user ID as follows: crsf/usr/lib/library/usr/lib/library.1.4 userid Joe.

Applications 306, 308, and 310 may generate requests 312, 314, and 316, which are handled by file system 318. File system 318 provides access to files, such as files 320, 322, 324, and 326. These files may take different forms, such as library files, configuration files, executable files, dynamic link library files, and other types of data files.

If the file request is for a switch file record in switch file records 304, that record is used to identify the appropriate file to be returned to the applications. If the system information used is a user ID, the appropriate file within a switch file record may be identified based on the current user that is logged into the system or application. Other types of system information may be used, such as the name of an application. When the appropriate file is identified, this file is passed to the application making the request.

Figure 4:
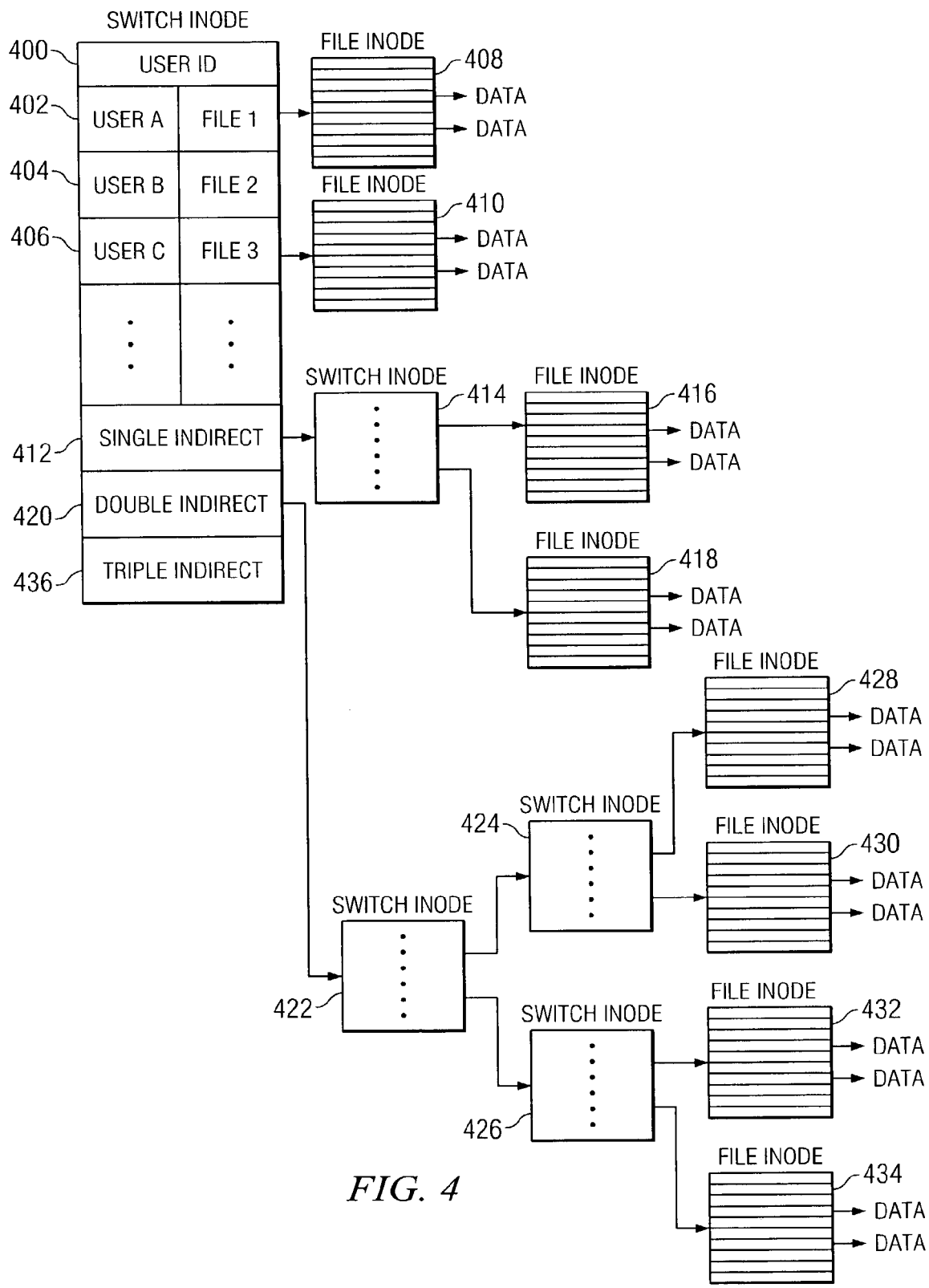
FIG. 4 is a diagram of data structures used in a switch file system in accordance with a preferred embodiment of the present invention.

Turning next to FIG. 4, a diagram of data structures used in a switch file system is depicted in accordance with a preferred embodiment of the present invention. In this example, the file system is a UNIX based file system, which may be implemented as file system 318 in FIG. 3. In this example, switch file records, such as switch file records 304, take the form of switch inodes. In these examples, a file is represented by an inode, which is basically a record that stores information about a specific file on a disk. An inode is also referred to as an index node and contains information, such as user and group identifiers of the file, the times of last modification and access, a count of the number of hard links to the file, and the type of file. Additionally, an inode contains pointers to disk blocks, containing the data contents of the files.

In these examples, a modified version of the inode, referred to as a switch inode is employed to act as a switch file type. Inode 400 is set up based on user IDs. Inode 400 includes entries 402, 404, and 406 in these examples. These entries are direct entries, which contain pointers that point to file inode 408 and file inode 410. These file inodes point to data blocks for the actual files. Entry 402 contains the user ID named "User A", entry 404 contains the user ID named "User B". Both of these entries contain path information to file 1. File 1 is represented by file inode 408. Entry 406 contains the user ID named "User C". This entry points to file inode 410.

These different file inodes point to different files, such as configuration files. In this example, switch inode 400 points to two different file inodes, file inode 408 and file inode 410. These file inodes point to the actual data for the files. When the appropriate file inode is selected, the file system will return the file associated with the selected inode to the application.

In addition to pointers to direct blocks as illustrated in entries 402, 404, and 406, indirect entries may be employed. For example, single indirect entry 412 points to switch inode 414, which in turn points to file inode 416 and file inode 418. With indirect switch inodes, the file system is able to point to larger amounts of data. Thus, if enough data is present in the different files associated with user IDs, an indirect entry, such as single indirect entry 412 may be used.

In this example, entry 420 is a double indirect entry, which points to switch inode 422. In turn, switch inode 422 points to switch inode 424 and switch inode 426. Switch inode 424 points to file inode 428 and file inode 430. In a similar fashion, switch inode 426 points to file inode 432 and file inode 434. Further, higher levels of indirects, such as a triple indirect in entry 436 may be employed, if needed. In addition, the system information used in this example are user IDs. Of course, other types of system information may be implemented depending on the particular selection.

Figure 5:
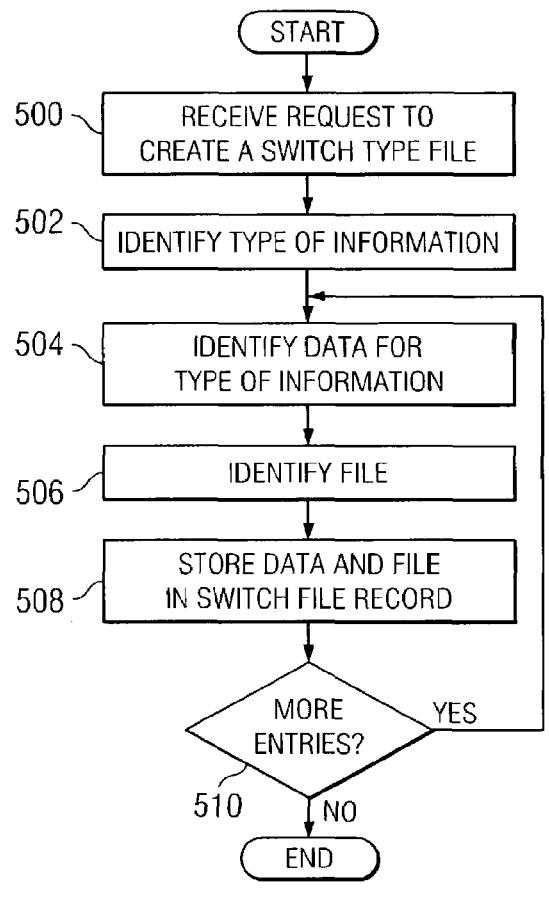
FIG. 5 is a flowchart of a process for creating a switch file type in accordance with a preferred embodiment of the present invention.

Turning next to FIG. 5, a flowchart of a process for creating a switch file type is depicted in accordance with a preferred embodiment of the present invention. The process illustrated in FIG. 5 may be implemented as switch file process 302 within operating system 300 in FIG. 3.

The process begins by receiving a request to create a switch file type (step 500). The switch file type is a data structure that may take various forms, such as an inode of other data structure employed in a file system, depending on the actual implementation. Thereafter, the type of information is identified (step 502). Step 502 is used to identify the type of system information that is to be stored in the record. This system information may be, for example, a user ID.

Thereafter, the data for the type of information is identified (step 504). The actual user ID is identified in this step. The file is then identified (step 506). In these examples, the data is the location and name of the file. This information is stored as a pointer to the data for the file. In particular, the pointer points to a file inode, which points to the actual file data. The information identified in steps 504 and 506 may be obtained using various mechanisms. For example, this information may be obtained from parameters in a command entered by a user. Additionally, a graphical user interface may be employed to prompt for and receive the information.

After the information has been identified, the data and the file are stored in the switch file record (step 508). A determination is then made as to whether more entries are to be made for the switch file record (step 510). If additional entries are to be made, the process returns to step 504. Otherwise, the process terminates.

Figure 6:
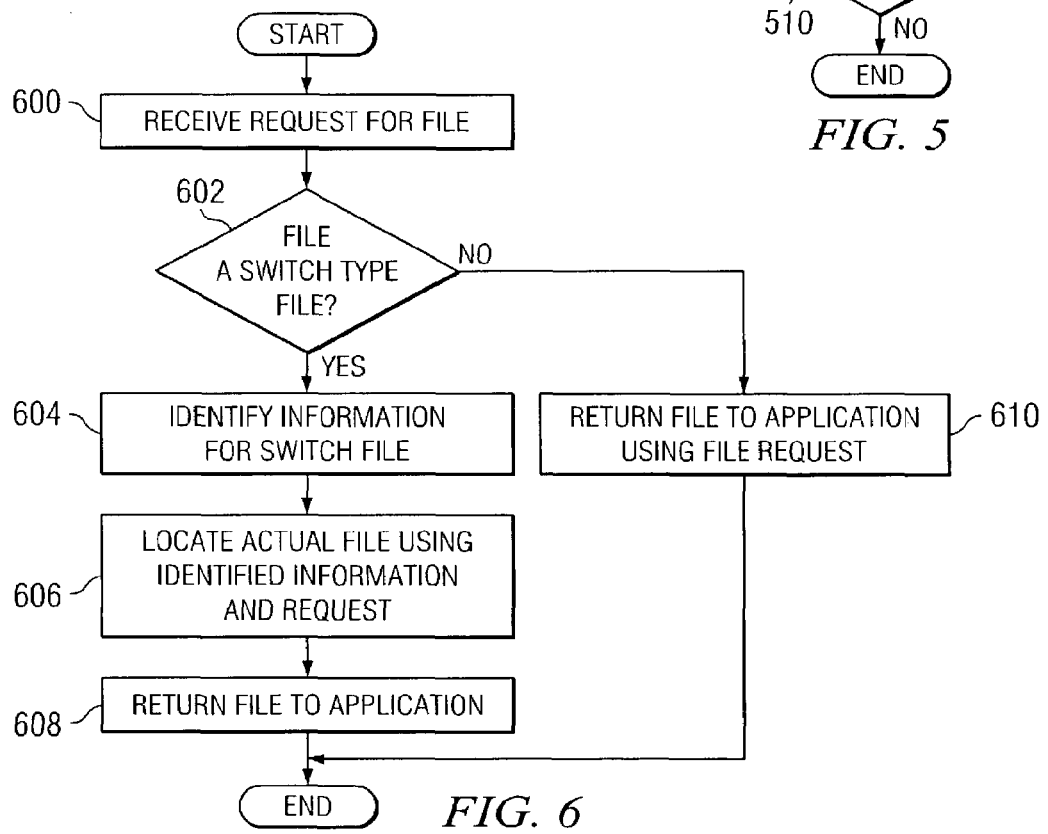
FIG. 6 is a flowchart of a process for handling requests for files in accordance with a preferred embodiment of the present invention.

Turning next to FIG. 6, a flowchart of a process for handling requests for files is depicted in accordance with a preferred embodiment of the present invention. The process illustrated in FIG. 6 may be implemented in file system 318 in these examples. As illustrated, file system 318 includes switch inodes as described with respect to FIG. 3 and FIG. 4 above.

The process begins by receiving a request for a file (step 600). In these examples, the request is received from an application, such as application 306 in FIG. 3. This request typically includes a path and file name. A determination is made as to whether the request is for a switch type file (step 602). If the request is for a switch type file, then information for the switch file is identified (step 604). Information identified in step 604 is information such as a user ID or application name. This information may be readily available to the system of the user may be prompted to enter information depending on the implementation.

Thereafter, the actual file is located using the identified information and the request (step 606). This step is performed by examining switch file records, such as inode 400 in FIG. 4 to determine an actual file to be returned to the requesting application. With a switch file record, the system information is used as an index or key to find the appropriate entry within the switch inode. The identified entry contains a pointer to a file inode, which points to the actual file. Thereafter, the file identified is returned to the application (step 608), with the process terminating thereafter.

With reference again to step 602, if the file is not for a switch type file, the file requested is returned to the application using only the request (step 610), with the process terminating thereafter. In this instance, the file system only identifies a file inode to obtain pointers to the location of the data making up the file. In these examples, a pointer to the inode is indirectly passed to the application requesting the file. The application receives a file descriptor used by the kernel to index a table of open files for the current process. Each table entry contains a pointer to a file structure that in turn points to the inode.

In this manner, the present invention provides a method, apparatus, and computer instructions for managing file requests. The mechanism of the present invention allows for the same file to be requested by an application, but allowing for the return of different files depending on system information. For example, a browser program requesting a configuration file may receive different files depending on the particular user ID that is currently on the system. Further, two versions of an application used on a system may both request the same dynamic link library file. In other words, both applications request a file having the same file name and path. Each application may require a different version of the dynamic link library in order to properly execute. The mechanism of the present invention may result in different versions of a dynamic link library file being returned depending on the version of the application requesting the file.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing requests for files, the method comprising the computer implemented steps of:
   receiving a request for a switch file from an application, wherein the application points to the switch file, wherein location information for the switch file points to a set of files;
   identifying a file from the set of files based on system information to form an identified file; and
   passing the identified file to the application, wherein the switch file is operable for allowing the application to point to a same desired file which is the switch file, while the application accesses a different one of the set of files when the application subsequently requests the same desired file, based on the system information, wherein the application is a first application and wherein a second application also points to the switch file, and further comprising a step of receiving a second request for the switch file from the second application, such that each one of the first application and the second application requests access to the switch file, and the first application and the second application are passed a different one of the set of files in response to the request from the first application for the switch file and the second request from the second application for the switch file, based on both the system information and the switch file.

2. The method of claim 1, wherein the identified file is selected from one of a configuration file, a library file, a dynamic link library, or an executable file.

3. The method of claim 1, wherein the system information that is used to identify the file from the set of files is at least one of a user identification, an identification of a version of the application, and a version of a library file required by the application.

4. The method of claim 1, wherein the second application is a different type of application from the first application.

5. The method of claim 1, wherein the receiving, identifying, and passing steps are located in an operating system for a data processing system.

6. The method of claim 1, wherein the location information is located in a switch inode, the switch inode comprising a plurality of entries at least some of which are accessible based upon user identifiers, and wherein the location information is accessed from the switch inode using a user identifier of a particular user operating the application.

7. The method of claim 1, wherein the switch file is associated with a switch inode that points to a set of inodes different from the switch inode, and wherein the set of inodes points to the set of files.

8. A method in a data processing system for managing a request for a file, the method comprising:
   receiving a request for the file from an application, wherein the request includes a file name;
   identifying a data structure corresponding to the file name, wherein the data structure contains location information corresponding to a set of files in association with identification information of a selected type; and
   passing a selected file from the set of files based on particular identification information of the selected type, wherein the identification information of the selected type is at least one of a user identification, a version of an application, and an identification of the application, and wherein the location information is accessed from the data structure using the identification information, wherein the file is one of a configuration file, a library file, a dynamic link library, and an executable file, and wherein the application is at least two different applications and wherein the data structure is operable for allowing the at least two applications to point to a same desired file which is the file, while the at least two applications access a different one of the set of files, even when each one of the at least two applications requests the same desired file, based on the system information.

9. A data processing system for managing requests for files, the data processing system comprising:
   receiving means for receiving a request for a switch file from an application, wherein the application points to the switch file, wherein location information for the switch file points to a set of files;
   identifying means for identifying a file from the set of files based on system information to form an identified file; and
   passing means for passing the identified file to the application, wherein the switch file is operable for allowing the application to point to a same desired file which is the switch file, while the application accesses a different one of the set of files when the application subsequently requests the same desired file, based on the system information, wherein the application is a first application and wherein a second application also points to the switch file, and further comprising a step of receiving a second request for the switch file from the second application, such that each one of the first application and the second application requests access to the switch file, and the first application and the second application are passed a different one of the set of files in response to the request from the first application for the switch file and the second request from the second application for the switch file, based on both the system information and the switch file.

10. The data processing system of claim 9, wherein the identified file is selected from one of a configuration file, a library file, a dynamic link library, or an executable file.

11. The data processing system of claim 9, wherein the system information that is used to identify the file from the set of files is at least one of a user identification, an identification of a version of the application, and a version of a library file required by the application.

12. The data processing system of claim 9, wherein the second application is a different type of application from the first application.

13. The data processing system of claim 9, wherein the receiving, identifying, and passing means are located in an operating system for the data processing system.

14. The data processing system of claim 9, wherein the location information is located in a switch inode, the switch inode comprising a plurality of entries at least some of which are accessible based upon user identifiers, and wherein the location information is accessed from the switch inode using a user identifier of a particular user operating the application.

15. The data processing system of claim 9, wherein the switch file is associated with a switch inode that points to a set of inodes different from the switch inode, and wherein the set of inodes points to the set of files.

16. A data processing system for managing a request for a file, the data processing system comprising:

receiving means for receiving a request for the file from an application, wherein the request includes a file name;

identifying means for identifying a data structure corresponding to the file name, wherein the data structure contains location information corresponding to a set of files in association with identification information of a selected type; and passing means for passing a selected file from the set of files based on particular identification information of the selected type, wherein the identification information of the selected type is at least one of a user identification, a version of an application, and an identification of the application, and wherein the location information is accessed from the data structure using the identification information, wherein the file is one of a configuration file, a library file, a dynamic link library, and an executable file, and wherein the application is at least two different applications and wherein the data structure is operable for allowing the at least two applications to point to a same desired file which is the file, while the at least two applications access a different one of the set of files, even when each one of the at least two applications requests the same desired file, based on the system information.

17. A data processing system in an operating system for managing requests for files, the data processing system comprising:

a bus system;

a memory connected to the bus system, wherein the memory includes a set of instructions; and a processing unit connected to the bus system, wherein the processing unit executes the set of instructions to receive a request for a switch file from an application, wherein the application points to the switch file, wherein location information for the switch file points to a set of files; identify a file from the set of files based on system information to form an identified file; and pass the identified file to the application, wherein the switch file is operable for allowing the application to point to a same desired file which is the switch file, while the application accesses a different one of the set of files when the application subsequently requests the same desired file, based on the system information, wherein the application is a first application and wherein a second application also points to the switch file, and further comprising a step of receiving a second request for the switch file from the second application, such that each one of the first application and the second application requests access to the switch file, and the first application and the second application are passed a different one of the set of files in response to the request from the first application for the switch file and the second request from the second application for the switch file, based on both the system information and the switch file.

18. A data processing system for managing a request for a file, the data processing system comprising:

a bus system;

a memory connected to the bus system, wherein the memory includes a set of instructions; and a processing unit connected to the bus system, wherein the processing unit executes the set of instructions to receive a request for the file from an application, wherein the request includes a file name; identify a data structure corresponding to the file name, wherein the data structure contains location information corresponding to a set of files in association with identification information of a selected type; and pass a selected file from the set of files based on particular identification information of the selected type, wherein the identification information of the selected type is at least one of a user identification, a version of an application, and an identification of the application, and wherein the location information is accessed from the data structure using the identification information, wherein the file is one of a configuration file, a library file, a dynamic link library, and an executable file, and wherein the application is at least two different applications and wherein the data structure is operable for allowing the at least two applications to point to a same desired file which is the file, while the at least two applications access a different one of the set of files, even when each one of the at least two applications requests the same desired file, based on the system information.

19. A computer recordable-type media encoded with a computer program product for managing requests for files, the computer program product comprising:

first instructions for receiving a request for a switch file from an application, wherein the application points to the switch file, wherein location information for the switch file points to a set of files;

second instructions for identifying a file from the set of files based on system information to form an identified file; and third instructions for passing the identified file to the application, wherein the switch file is operable for allowing the application to point to a same desired file which is the switch file, while the application accesses a different one of the set of files when the application subsequently requests the same desired file, based on the system information, wherein the identified file is one of a configuration file, a library file, a dynamic link library, and an executable file, and wherein the application is at least two different applications and wherein the switch file is operable for allowing the at least two applications to point to a same desired file which is the switch file, while the at least two applications access a different one of the set of files, even when each one of the at least two applications requests the same desired file, based on the system information.

20. A computer recordable-type media encoded with a computer program product for managing a request for a file, the computer program product comprising:

first instructions for receiving a request for the file from an application, wherein the request includes a file name;

second instructions for identifying a data structure corresponding to the file name, wherein the data structure contains location information corresponding to a set of files in association with identification information of a selected type; and third instructions for passing a selected file from the set of files based on particular identification information of the selected type, wherein the identification information of the selected type is at least one of a user identification, a version of an application, and an identification of the application, and wherein the location information is accessed from the data structure using the identification information, wherein the file is one of a configuration file, a library file, a dynamic link library, and an executable file, and wherein the application is at least two different applications and wherein the data structure is operable for allowing the at least two applications to point to a same desired file which is the file, while the at least two applications access a different one of the set of files, even when each one of the at least two applications requests the same desired file, based on the system information.

* * * * *